J. N. M. WILSON.
VAPORIZER.
APPLICATION FILED JULY 21, 1911.

1,009,816.

Patented Nov. 28, 1911.

Witnesses:
A. A. Olson
B. G. Richards

Inventor:
James N. M. Wilson
by Joshua R. H. Potts
his Attorney

UNITED STATES PATENT OFFICE.

JAMES N. M. WILSON, OF CHICAGO, ILLINOIS.

VAPORIZER.

1,009,816.  Specification of Letters Patent.  Patented Nov. 28, 1911.

Application filed July 21, 1911. Serial No. 639,714.

*To all whom it may concern:*

Be it known that I, JAMES N. M. WILSON, a citizen of the United States, and a resident of the city of Chicago, county of Cook, and State of Illinois, have invented certain new and useful Improvements in Vaporizers, of which the following is a specification.

My invention relates to improvements in vaporizers and more specifically to that class thereof which are used to liberate medicants in gaseous or vapor form either for therapeutic use, by way of inhalation, or more particularly to fumigate the interior of rooms following infectious or contagious diseases; my device being more especially intended for use in connection with solidified formaldehyde.

The object of my invention is the production of a vaporizer of the character mentioned which will be of improved construction and efficient in operation.

Other objects will appear hereinafter.

With these objects in view my invention consists in the combinations and arrangements of parts hereinafter described and claimed.

Figure 1:
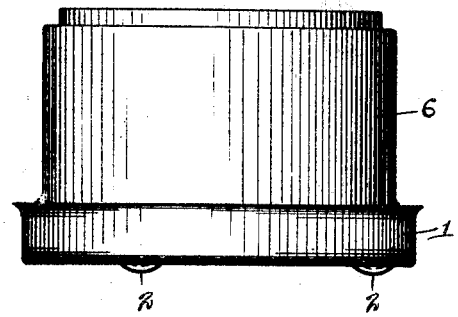
Figure 2:
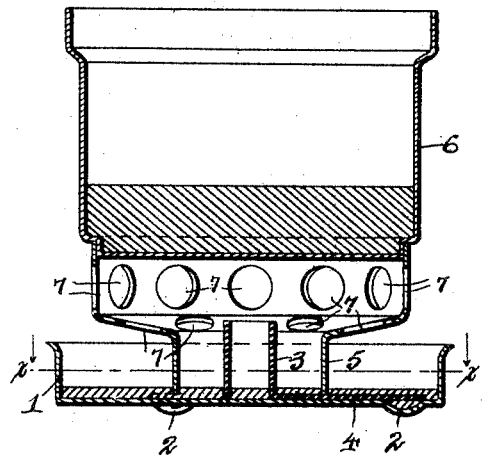
Figure 3:
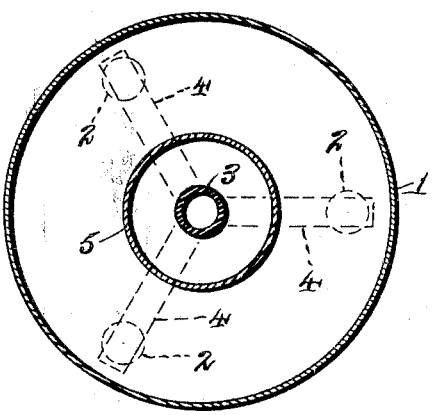

My invention will be best understood by reference to the accompanying drawing forming a part of this specification, and in which, Figure 1 is a side elevation of a vaporizer embodying the preferred form of my invention, the same being shown in collapsed or inoperative position, Fig. 2 is a central vertical section thereof arranged for use, and Fig. 3 is a horizontal section taken on line x—x of Fig. 2.

The preferred form of my construction as illustrated in the drawing comprises a circular shallow pan 1 which is designed to contain the fuel, paraffin being the fuel which is preferably used in this connection. The member 1 is provided with depending projections 2 which serve as feet for member 1 so as to elevate the bottom of the latter from the floor or other surface or support upon which the same may be arranged, thereby permitting a circulation of air underneath the pan 1 and obviating the otherwise possibility of scorching the surface support upon which the pan is resting.

Arranged centrally within the fuel container 1 is a tubular wick 3 formed preferably of asbestos or other non-heat conducting material, said wick being provided at its base with a plurality of projecting arms 4 which radiate from said wick upon the bottom of said container. Surrounding the wick 3 is a tubular shield 5, the reduced portion thereof being supported upon the arms 4, the latter serving as a means of insulation to prevent the conduction of heat from said shield to the member 1 when the device is in operation. The upper end portion of the member 5 is enlarged to fit snugly the lower reduced end portion of the disinfectant cup 6 which is adapted to be removably supported thereon as shown in Fig. 2. The upper end portion or mouth of the cup 6 is enlarged slightly so as to adapt the same to fit snugly within the vertical wall or mouth of the member 1, as shown in Fig. 1, said portion of said cup being adapted to be pressed down into the paraffin contained in said container or member 1 to form a hermetical seal and thus prevent the deterioration of the formaldehyde or other medicant contained in the cup when the device is not in use. And furthermore such construction permits of utilization of the surplus space at the upper end of the cup when inverted by affording accommodation for the upper end portion of shield 5, and thereby reducing or collapsing the device to compact and convenient size, for storage or transportation.

Provided in the upper end portion of the shield 5 are perforations 7 which afford ventilation for the flame which is supported at the wick 3 when the device is in operation.

A vaporizer of the construction set forth is of economical construction and the same is of great efficiency in operation. By reason of the projecting arms 4 of the wick which serve to insulate the shield 5 from the member 1, the conduction of heat from the former to the latter as above mentioned is prevented and the consequent danger of the ignition of the paraffin fuel and resulting fire obviated. In this latter connection the space directly surrounding the wick together with the under draft which is afforded because of the peculiar location of the perforations 7 serves to prevent the flame of the wick, or its heat from descending and igniting the paraffin fuel, a partial vacuum being formed at the base portion of the wick when the latter is lighted.

By reason of the protective construction of shield 5, inclusive of the ventilation and combustion afforded by perforations 7, the flame from wick 3 while producing an intense and uniform heat, and therefore an effective vaporization of the contents of cup 6, is self regulated to the confines of shield 5, thereby preventing any possibility of escape, of smoke, or ignition and destruction of the gas being generated in cup 6. In addition to this function of the arms 4, the latter also, because of their projection into the surrounding paraffin fuel, by reason of capillary attraction, serve to feed the paraffin to the wick insuring a constant flame at the wick so long as any paraffin remains in the container.

By reason of the construction whereby the descent of heat or flame and the ignition of fuel and consequent danger of fire is prevented the use of an extra lower water pan or improvised dishes for water which are necessary in the use of all other similar devices now on the market, is obviated.

Other points of advantage of the construction have been pointed out in the description and need not here again be specifically enunciated.

While I have illustrated and described the preferred form of construction for carrying my invention into effect, this is capable of variation and modification without departing from the spirit of the invention. I therefore do not wish to be limited to the precise details of construction as set forth, but desire to avail myself of such variations and modifications as come within the scope of the appended claims.

Having described my invention what I claim as new and desire to secure by Letters Patent is:

1. A vaporizer, comprising a lower fuel container; a vessel arranged above said fuel container; a tubular shield arranged in said fuel container and supporting said vessel; and a wick arranged within said shield and having its base portion interposed between said fuel container and said shield, substantially as described.

2. A vaporizer, comprising a lower fuel container; a vessel arranged above said fuel container; a tubular perforated shield arranged in said fuel container and supporting said vessel; and a wick arranged within said shield and having its base portion interposed between said fuel container and said shield, substantially as described.

3. A vaporizer, comprising a lower fuel container; a vessel arranged above said fuel container; a tubular shield arranged in said fuel container and supporting said vessel; and a wick arranged within said shield and having its base portion interposed between said fuel container and said shield, said vessel being adapted to be inverted, its mouth being adapted to fit snugly within said fuel container, substantially as described.

4. A vaporizer, comprising a lower shallow fuel container; a cup arranged above said fuel container; a tubular perforated shield arranged in said fuel container and supporting the lower end of said cup; and a wick arranged upon said fuel container within said shield, said wick having base portions interposed between said fuel container and said shield, said vessel being adapted to be inverted, its mouth being adapted to fit snugly within said fuel container, substantially as described.

5. A vaporizer, comprising a lower circular shallow fuel container; a cup arranged above said fuel container; a tubular perforated shield arranged in said fuel container and supporting the lower end of said vessel, said portion of said vessel being reduced so as to fit snugly within the upper end of said shield; and a wick arranged upon said fuel container within said shield, said wick having base portions interposed between said fuel container and said shield, said vessel being adapted to be inverted, its mouth being adapted to fit snugly within said fuel container, substantially as described.

6. A vaporizer, comprising a lower shallow fuel container; a vessel arranged above said fuel container; a tubular perforated shield having a reduced base portion arranged upon said fuel container and having an enlarged upper end portion supporting the base portion of said vessel; and a wick arranged upon said fuel container within said shield, said wick having projecting base portions interposed between the adjacent surfaces of said fuel container and said shield, said vessel being adapted to be inverted and have its mouth fit snugly into said fuel container, substantially as described.

7. A vaporizer, comprising a lower shallow fuel container; a disinfectant cup arranged above said fuel container; a tubular shield having a reduced base portion arranged upon said fuel container and an enlarged upper end portion supporting the base portion of said cup, the base portion of said shield being provided with perforations; and a tubular wick arranged upon said fuel container within said shield, said wick having projecting base portions interposed between said fuel container and said shield, said cup being adapted to be inverted and have its mouth fit snugly into said fuel container, substantially as described.

In testimony whereof I have signed my name to this specification in the presence of two subscribing witnesses.

JAMES N. M. WILSON.

Witnesses:
 ARTHUR A. OLSON,
 JOSHUA R. H. POTTS.